(12) United States Patent
Wang et al.

(10) Patent No.: US 7,852,955 B2
(45) Date of Patent: Dec. 14, 2010

(54) ORTHOGONAL FREQUENCY DIVISION MULTIPLEXING TRANSMITTING AND RECEIVING METHOD AND DEVICE THEREOF

(75) Inventors: Huan-Chun Wang, Taipei County (TW); De-Jhen Huang, Kaohsiung (TW); Chang-Lan Tsai, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 670 days.

(21) Appl. No.: 11/780,488

(22) Filed: Jul. 20, 2007

(65) Prior Publication Data

US 2008/0298479 A1 Dec. 4, 2008

(30) Foreign Application Priority Data

May 31, 2007 (TW) ............... 96119576 A

(51) Int. Cl.
*H04K 1/10* (2006.01)

(52) U.S. Cl. ............... 375/260; 342/196; 708/403; 708/404; 708/405; 370/203; 370/206; 370/208; 370/210

(58) Field of Classification Search ............ 375/260; 342/196; 708/403, 404, 405; 370/203, 206, 370/208, 210
See application file for complete search history.

(56) References Cited

U.S. PATENT DOCUMENTS

| | | | | |
|---|---|---|---|---|
| 7,386,072 B2 * | 6/2008 | Uno | ............... | 375/344 |
| 7,580,490 B2 * | 8/2009 | Suh et al. | ............... | 375/349 |
| 7,649,951 B2 * | 1/2010 | Moffatt | ............... | 375/260 |
| 2003/0043927 A1 * | 3/2003 | Suzuki | ............... | 375/260 |
| 2003/0182612 A1 * | 9/2003 | Tsuchie | ............... | 714/755 |
| 2005/0068886 A1 * | 3/2005 | Wang et al. | ............... | 370/210 |
| 2005/0141414 A1 * | 6/2005 | Cheun et al. | ............... | 370/210 |
| 2005/0259568 A1 * | 11/2005 | Yeh et al. | ............... | 370/208 |
| 2005/0265479 A1 * | 12/2005 | Fujii et al. | ............... | 375/303 |
| 2007/0098095 A1 * | 5/2007 | Kim et al. | ............... | 375/260 |
| 2007/0217329 A1 * | 9/2007 | Abedi | ............... | 370/208 |
| 2008/0316912 A1 * | 12/2008 | Al Adnani | ............... | 370/210 |
| 2009/0003478 A1 * | 1/2009 | Kim et al. | ............... | 375/260 |

FOREIGN PATENT DOCUMENTS

| | | |
|---|---|---|
| CN | 1674572 | 9/2005 |
| EP | 1032174 | 8/2000 |
| EP | 1758326 | 2/2007 |

OTHER PUBLICATIONS

IEEE802.11a, "Part 11: Wireless LAN Medium Access Control (MAC) and Physical Layer (PHY) specifications High-speed Physical Layer in the 5 GHz Band", IEEE 1999, pp. 9 and 24.*
"1st Office Action of China Counterpart Application" issued on Mar. 16, 2010, p. 1-p. 6.

* cited by examiner

*Primary Examiner*—Juan A Torres
(74) *Attorney, Agent, or Firm*—Jianq Chyun IP Office

(57) ABSTRACT

An orthogonal frequency division multiplexing (OFDM) transmitting apparatus including a signal processing unit, a subcarrier orthogonalization processing unit, and a transmitting unit is provided. The signal processing unit divides a received signal into several real parts and several corresponding imaginary parts. The subcarrier orthogonalization processing unit is coupled to the signal processing unit for receiving the real and the imaginary parts of the signal, and for making the real and the imaginary parts respectively carried by a plurality of different and orthogonal subcarriers. The transmitting unit is coupled to the subcarrier orthogonalization processing unit to transmit the subcarriers.

12 Claims, 10 Drawing Sheets

ORTHOGONAL FREQUENCY DIVISION MULTIPLEXING TRANSMITTING AND RECEIVING METHOD AND DEVICE THEREOF

CROSS-REFERENCE TO RELATED APPLICATION

This application claims the priority benefit of Taiwan application serial no. 96119576, filed May 31, 2007. All disclosure of the Taiwan application is incorporated herein by reference.

BACKGROUND OF THE INVENTION

1. Field of the Invention

The present invention relates to a data transmission technology. More particularly, the present invention relates to an orthogonal frequency division multiplexing (OFDM) transmitting and receiving method and a device thereof.

2. Description of Related Art

OFDM technology using a concept of parallel data transmission and frequency division multiplexing has been in the 1960s, and has been widely applied to communication system and so on currently. Generally speaking, a communication system performs the transmission in the following two manners, namely single carrier and multi-carrier, under the limitation of constant bandwidth. The "multi-carrier transmission" means that a user can use a plurality of subcarriers at the same time to transmit and receive signals. The basic concept of the OFDM transmission uses a plurality of orthogonal subcarriers to transmit signals which are originally a single batch of high-speed data at a lower transmission speed.

The OFDM technology, having a higher data transmission speed and a characteristic of effectively overcoming frequency selective fading channel, has been widely applied to various wireless communication systems at present.

According to a common OFDM system as shown in FIG. 1A, an inputted complex symbol signal d(k) has a real part $d_0(k)$ and an imaginary part $d_1(k)$, i.e. $d(k)=d_0(k)+j \cdot d_1(k)$, where $d_0(k)$ and $d_1(k)$ are real numbers and $k=0, 1, 2, \ldots, N-1$ representing different subcarriers. Then, an inverse Fourier transform is adopted for modulation, and the data is carried on the subcarrier for transmission in the manner as shown in FIG. 1B. FIG. 1C is a schematic view illustrating an orthogonality of the subcarriers.

Currently, real parts and imaginary parts of signals are carried on cosine and sine subcarriers of a same frequency to transmit and receive data. However, under this architecture, the system performance is hardly to increase and to realize the frequency diversity.

Therefore, for those skilled persons and researchers, how to improve the performance and the frequency diversity without increasing the complexity of the system is a key issue.

SUMMARY OF THE INVENTION

Accordingly, an OFDM transmitting apparatus including a signal processing unit, a subcarrier orthogonalization processing unit, and a transmitting unit is provided by the present invention. The signal processing unit divides a received complex signal into several real parts and several corresponding imaginary parts. The subcarrier orthogonalization processing unit is coupled to the signal processing unit, for receiving the real parts and the imaginary parts of the signal, and making the real parts and the imaginary parts respectively carried on a plurality of different and orthogonal subcarriers. The transmitting unit is coupled to the subcarrier orthogonalization processing unit, for transmitting the subcarriers.

Additionally, an OFDM receiving apparatus including a receiving unit, a subcarrier demodulation unit, and a signal output processing unit is provided by the present invention. The receiving unit is used to receive a radio frequency (RF) signal, for generating a set of discrete signals. The subcarrier demodulation unit is coupled to the receiving unit, and demodulates the discrete signals to obtain a complex signal. The signal output processing unit is coupled to the subcarrier demodulation unit, for capturing and outputting real parts of the complex signal.

Further, the present invention provides an OFDM transmitting method, which includes the following steps. First, a signal having a plurality of real parts and a plurality of imaginary parts corresponding to the real parts is received. The real parts and the imaginary parts of the signal are respectively carried on the subcarriers of different frequencies, in which the different subcarriers are orthogonal for real number signals. The subcarriers carrying the real parts and the imaginary parts are transmitted.

In order to make the aforementioned and other objects, features and advantages of the present invention comprehensible, exemplary embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EMBODIMENTS

Figure 1A:
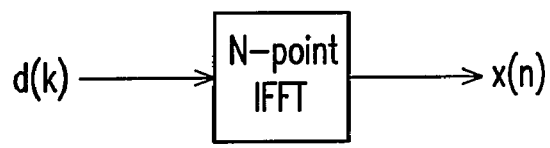
FIG. 1A is a schematic view of a common OFDM system.
Figure 1B:
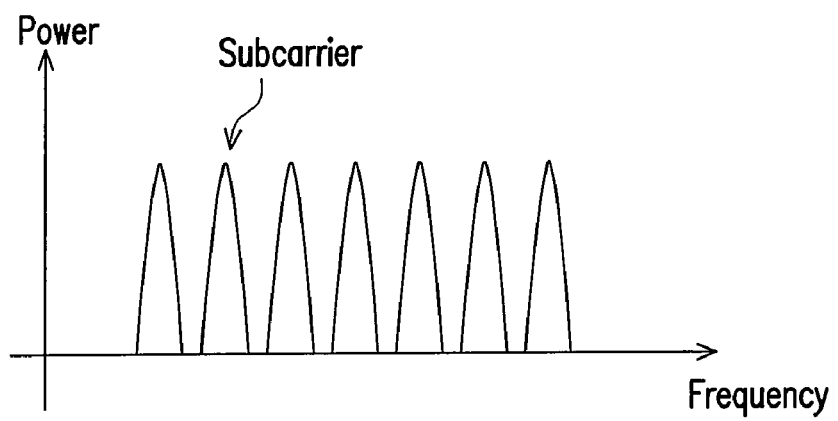
FIG. 1B is a schematic view illustrating a frequency allocation of subcarriers carrying data in the OFDM system.
Figure 1C:
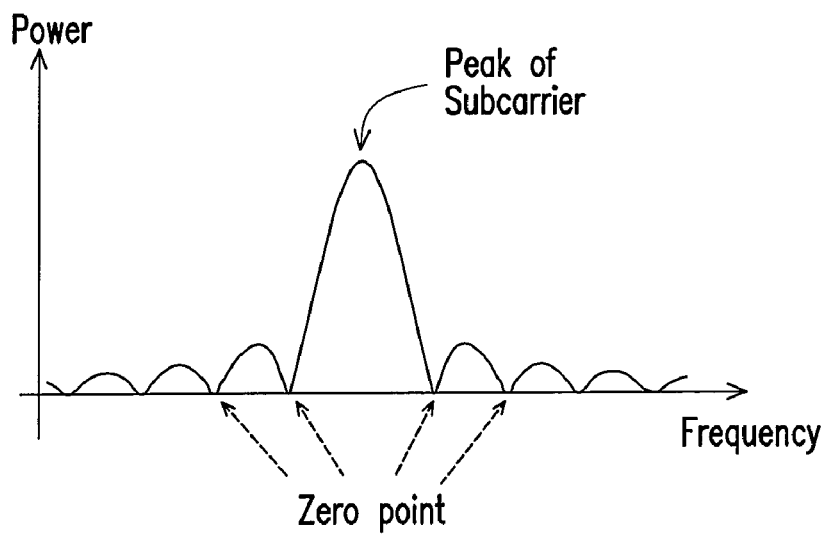
FIG. 1C is a schematic view illustrating an orthogonality of subcarriers of the OFDM system.
Figure 2A:
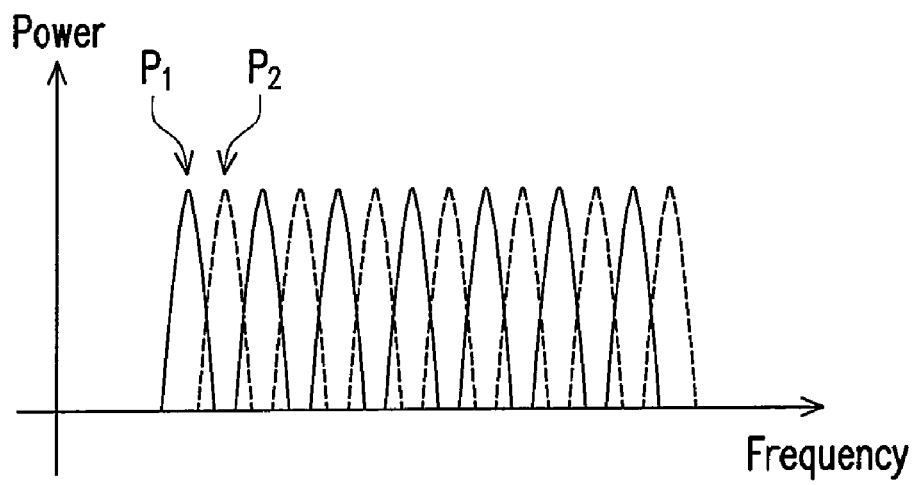
FIGS. 2A and 2B are schematic views illustrating an allocation of subcarriers according to an exemplary embodiment of the present invention, respectively.

FIG. 2A is a schematic view illustrating an allocation of subcarriers according to an embodiment of the present invention. As shown in FIG. 2A, the subcarriers carrying the real parts of the signal are indicated by a solid line, and the subcarriers carrying the imaginary parts of the signal are indicated by a dash line. In the embodiment, the subcarriers carrying the imaginary parts and the subcarriers carrying the real parts are alternately allocated, and are orthogonal to one another. The subcarriers carrying the imaginary parts can, for example, but not limited to, be allocated at a central position of two subcarriers indicated by the solid line, or approximately at the center. The allocation is not limited to that subcarriers carrying the real parts of the complex symbol and subcarriers carrying the corresponding imaginary parts are alternately allocated. For example, the subcarriers carrying the real parts and the subcarriers carrying the corresponding imaginary parts have several intervals, or the real parts and the imaginary parts are randomly allocated on the subcarriers. The allocation manner is determined depending on the design requirements of the system.

Figure 2B:
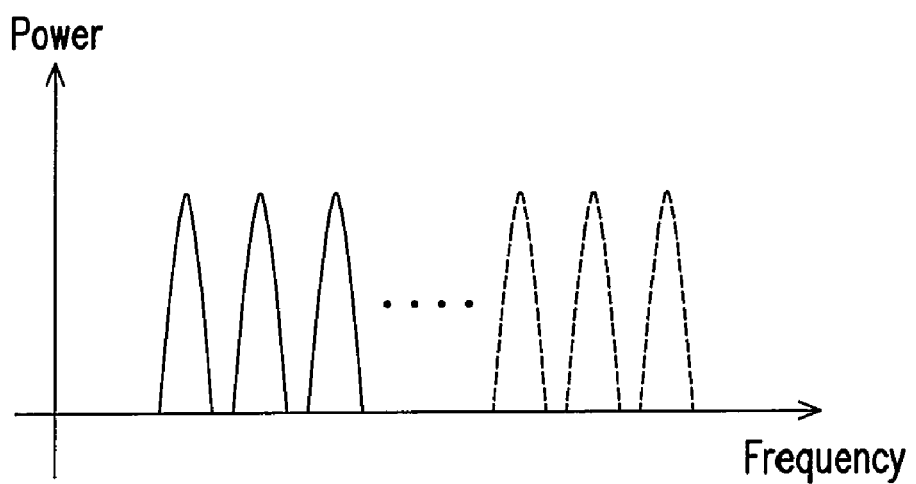

FIG. 2B is a schematic view illustrating another allocation of subcarriers according to an exemplary embodiment of the present invention. As shown in FIG. 2B, a subcarrier group corresponding to the real parts and a subcarrier group corresponding to the imaginary parts are separated from each other as long as they are orthogonal. In the above description, only two embodiments are illustrated, while the actual allocation manner is determined depending on the design requirements of the system, and is not limited herein.

Figure 2C:
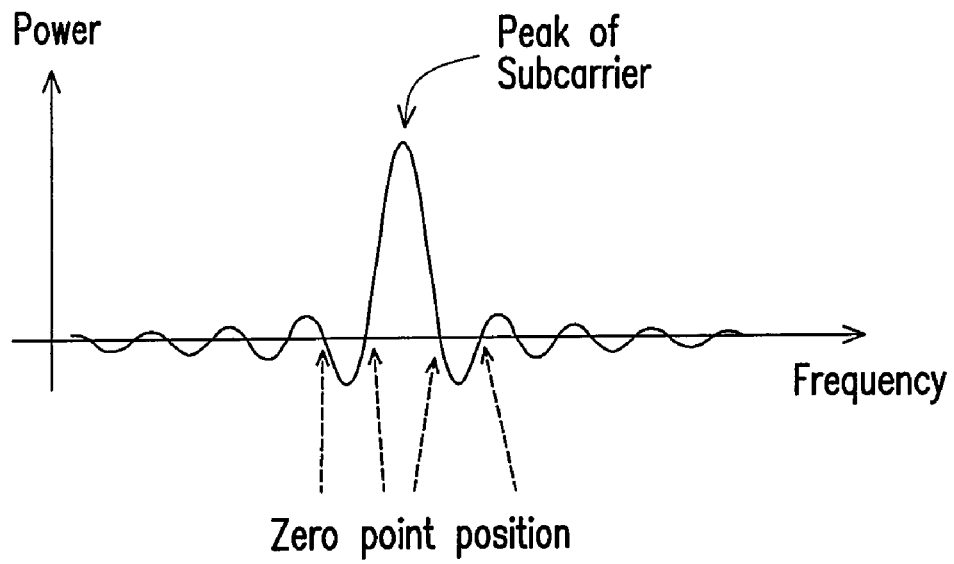
FIGS. 2C and 2D are schematic views illustrating the orthogonality of the subcarriers and other subcarriers according to an exemplary embodiment of the present invention, respectively.
Figure 2D:
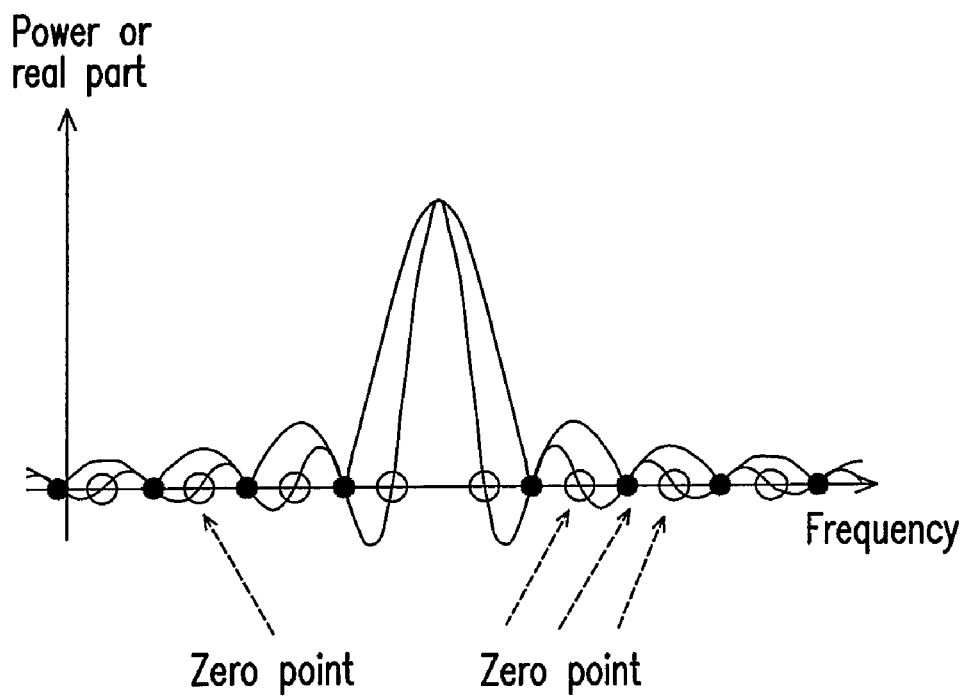

FIGS. 2C and 2D are schematic views illustrating the orthogonality of the subcarriers and other subcarriers according to an exemplary embodiment of the present invention, respectively. As shown in FIG. 2C, the data is placed at peaks of the subcarriers, and other subcarriers can be placed at zero points as shown in the figure, such that they are orthogonal. FIG. 2D illustrates a difference between the number of the subcarriers of the present invention and the conventional number and allocations. As shown in FIG. 2D, the black dots indicate orthogonal positions of the subcarriers carrying the complex symbols according to the conventional OFDM, and the circles indicates newly added positions of subcarriers where the imaginary parts of the original complex symbols are placed according to the present invention. Therefore, under the condition that the orthogonality is satisfied, by the use of the real and imaginary parts of the data are used according to an exemplary embodiment of the present invention, the subcarriers carrying the data in the frequency domain becomes more, and the frequency diversity is enhanced, thus enhancing the system performance.

A complex number multiplier can be used to achieve the above allocation of subcarriers. In addition, an inverse discrete Fourier transform (IDFT)/inverse fast Fourier transform (IFFT) unit or an fast Fourier transform (FFT)/fast Fourier transform (FFT) unit can be used to process signals. Then, the circuit structure of the present invention is further illustrated with the embodiments.

Figure 3A:
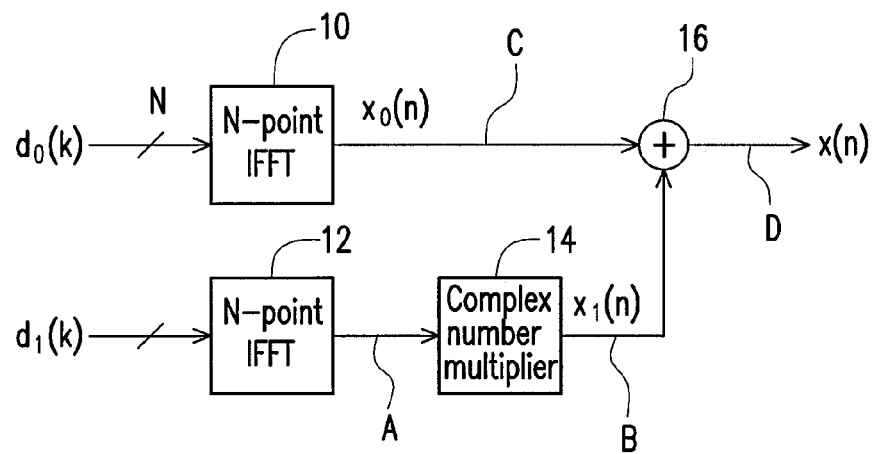
FIG. 3A is a schematic view of a circuit architecture of an OFDM transmitting apparatus according to an exemplary embodiment of the present invention.
Figure 3B:
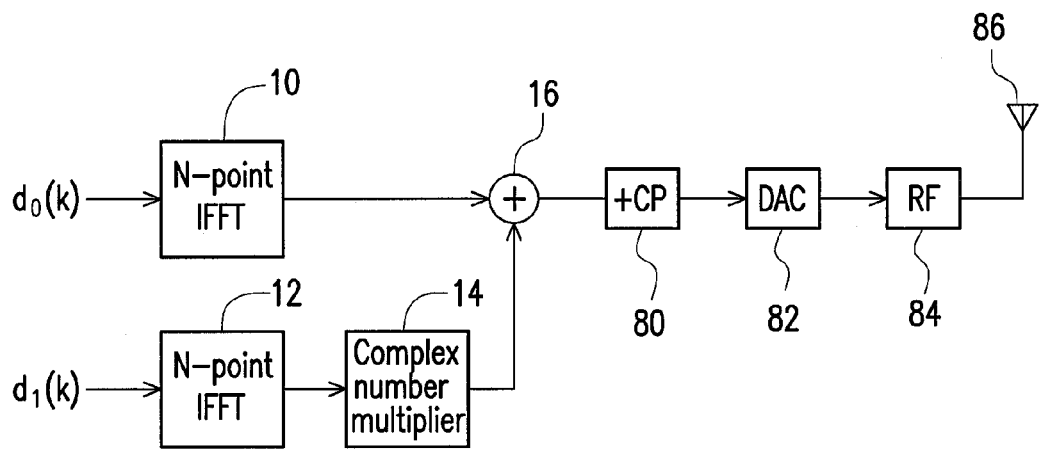
FIG. 3B is a schematic view of a circuit architecture using a complete transmission end of FIG. 3A.

FIG. 3A is a schematic view of a circuit architecture of an OFDM transmitting apparatus according to an exemplary embodiment of the present invention, and FIG. 3B is a schematic view of a circuit architecture using a complete transmission end of FIG. 3A.

As shown in the example of FIGS. 3A and 3B, the OFDM transmitting apparatus includes a signal processing unit, a first IFFT (or IDFT) 10 and a second IFFT (or IDFT) 12, a complex number multiplier 14, an adder 16, and a transmitting unit.

The signal processing unit is mainly used to divide the signal d(k) (d(k)=$d_0(k)$+j·$d_1(k)$, where k=0, 1, 2, ..., N−1) into real parts $d_0(k)$ and imaginary parts $d_1(k)$, where $d_0(k)$ and $d_1(k)$ are real numbers. The inner construction of the signal processing unit is not particularly limited as long as the objective can be achieved. In addition, the signal processing unit is replaced by $d_0(k)$ and $d_1(k)$ in FIG. 3A or subsequent drawings.

N-point IFFT 10 receives the real parts $d_0(k)$ of the signal, and performs the inverse fast (or discrete) Fourier transform on it. After the Fourier transform, the N-point IFFT 10 outputs $x_0(n)$, expressed by the following formula:

$$x_0(n) = \frac{1}{\sqrt{N}} \sum_{k=0}^{N-1} d_0(k) e^{\frac{j2\pi kn}{N}}$$
$$= IFFT\{d_0(k)\}$$

In addition, the imaginary parts $d_1(k)$ are converted with the carrier frequency different from that of $d_0(k)$, and the output is $x_1(n)$, expressed by the following formula:

$$x_1(n) = \frac{1}{\sqrt{N}} \sum_{k=0}^{N-1} d_1(k) e^{\frac{j2\pi(k+1/2)n}{N}}$$
$$= e^{\frac{j\pi n}{N}} \frac{1}{\sqrt{N}} \sum_{k=0}^{N-1} d_1(k) e^{\frac{j2\pi kn}{N}}$$
$$= e^{\frac{j\pi n}{N}} \times IFFT\{d_1(k)\}$$

It can be seen from the above formula that the conversion from $d_1(k)$ to $x_1(n)$ can be equivalently achieved by using an N-point IFFT and multiplying a complex coefficient $e^{j\pi n/N}$, e.g. the N-point IFFT 12 and the complex number multiplier 14 in the figure. The complex number multiplier 14 functions to make the N-point IFFT 12 to generate a shift on frequency, so that the N-point IFFT 12 has a different carrier frequency from the N-point IFFT 10.

Then, the output of the complex number multiplier 14 and the output of the N-point IFFT 10 are inputted into the adder 16, and combined into an output signal x(n) $x_0(n)$+$x_1(n)$. That is, the distribution of the subcarriers carrying the data becomes the example as shown in FIG. 2A or 2B.

Afterwards, the signal after processed by the adder 16 is transmitted to the transmitting unit for processing, so as to be transmitted to a receiving side through an antenna and the like. The general architecture of the transmitting unit processing is as shown in FIG. 3B, which includes a cyclic prefix (CP) adding unit 80, a digital to analog converter (DAC) 82, an RF module 84, and an antenna 86. The CP adding unit 80 mainly add the CP to the discrete signal (or symbol) x(n). The subcarriers remains orthogonal under multi-path channel to avoid the interference between the carriers by adding the CP. For example, taking the OFDM as an example, one OFDM symbol interval may include a protection interval (cyclic prefix) and a data symbol interval (i.e. FFT integration interval). The signal added with the added CP is transmitted to the DAC 82 for conversion, and then is processed by the RF module 84, such that the signal can be transmitted by the antenna 86.

Figure 4A:
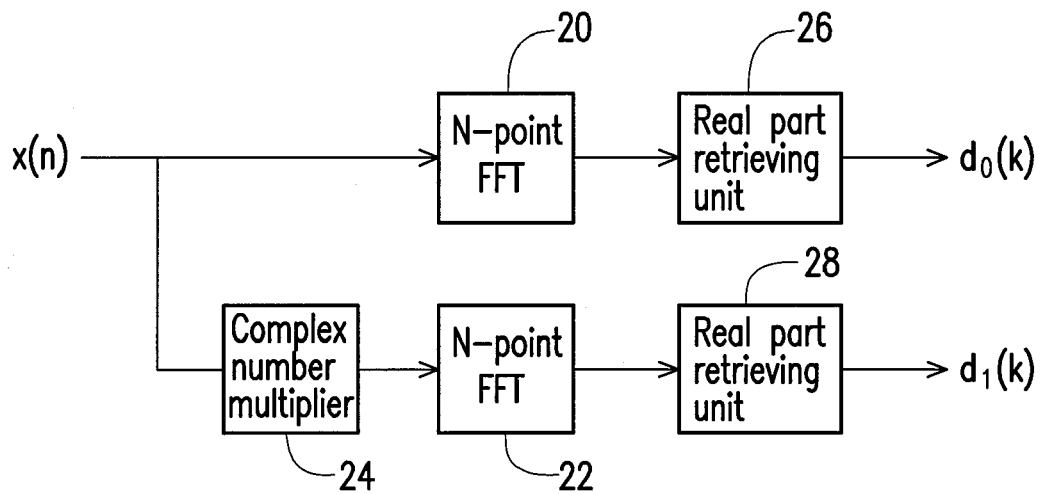
FIG. 4A is a schematic view of a circuit architecture of an OFDM receiving apparatus according to an exemplary embodiment of the present invention.

Then, the present invention is illustrated to be applied to the receiving end. FIG. 4A is a schematic view of a circuit architecture of an OFDM receiving apparatus according to an exemplary embodiment of the present invention, and FIG. 4B is a schematic view of a circuit architecture using a complete receiving end of FIG. 4A.

The circuit of the receiving end is substantially similar to that of the transmission end, except that the procedure is reversed. As shown in FIG. 4A, the OFDM receiving apparatus includes a receiving unit, a complex number multiplier 24, a first N-point FFT (or DFT) 20 and a second N-point FFT (or DFT) 22, and signal output processing units (real part retrieving units) 26, 28.

Figure 4B:
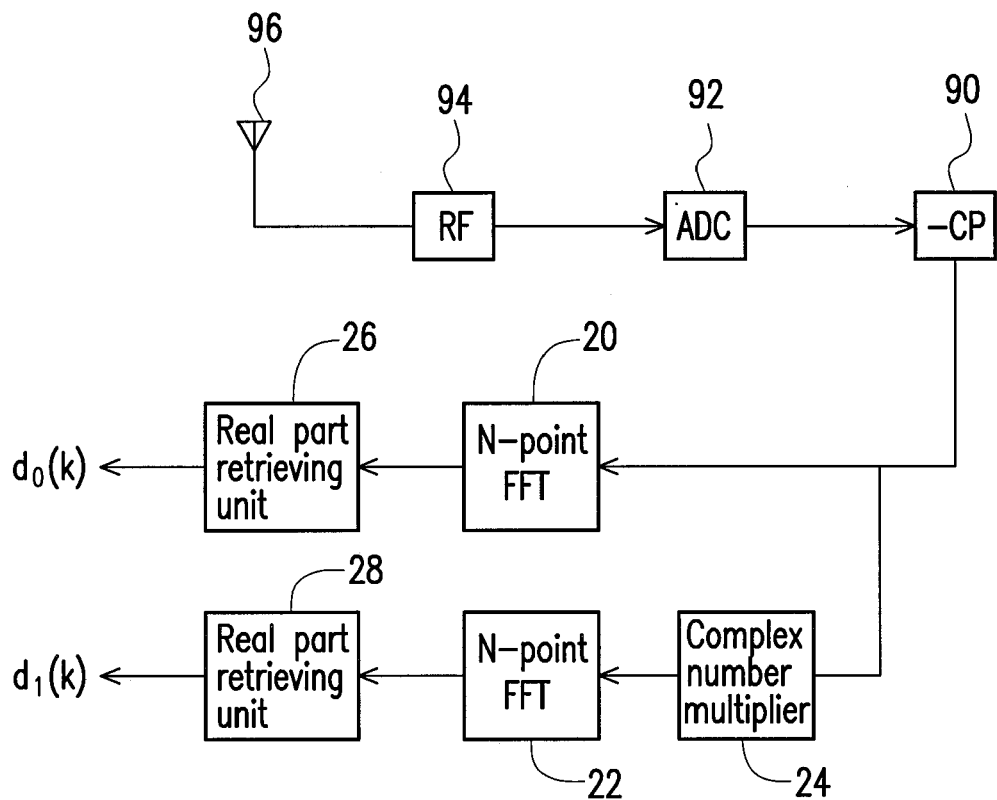
FIG. 4B is a schematic view of a circuit architecture using a complete receiving end of FIG. 4A.

As shown in FIG. 4B, the signal after received by an antenna 96 passes through an RF module 94, an analog to digital converter (ADC) 92, and a CP removal unit 90 to generate a discrete signal x(n). Thereafter, the signal x(n) is transmitted to the N-point FFT (or DFT) 20 to be output, and passes through the complex number multiplier 24 and is processed by the N-point FFT (or DFT) 22 to be output. Finally, the signals output by the N-point FFTs (or DFTs) 20, 22 are processed by the signal output processing units 26, 28 for taking out the real parts, and the originally transmitted data $d_0(k)$ and $d_1(k)$ are resumed. The processing method is substantially reverse to that of FIG. 3A.

In the general structure, the complex data (the real and the imaginary parts) is inputted into FFT (or DFT), so for the N-point complex data, the FFT (or DFT) is complex in terms of requiring Nlog(N) multipliers. However, in this embodiment, the real and the imaginary parts of the data are transmitted by different subcarriers, so it is possible to use two FFTs (or DFTs) to achieve the purpose with halved calculation complexity. For the N-point data, the complexity of the FFT (or DFT) and the complex number multiplier 14 is that Nlog(N)+4N−4 multipliers are used. Here, the amount (complexity) will not be increased too much as compared with the conventional art, but the diversity of the frequency is increased, such that the signal processing becomes more perfect. Particularly, for the current communication standard, the N value is great, and the difference therebetween becomes smaller.

Figure 5A:
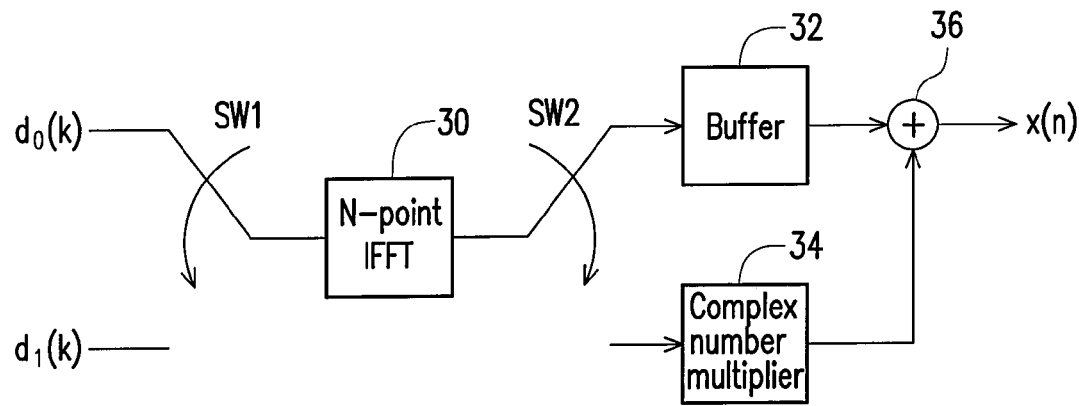
FIG. 5A is a schematic view of a circuit architecture of an OFDM transmitting apparatus according to another exemplary embodiment of the present invention.
Figure 5B:
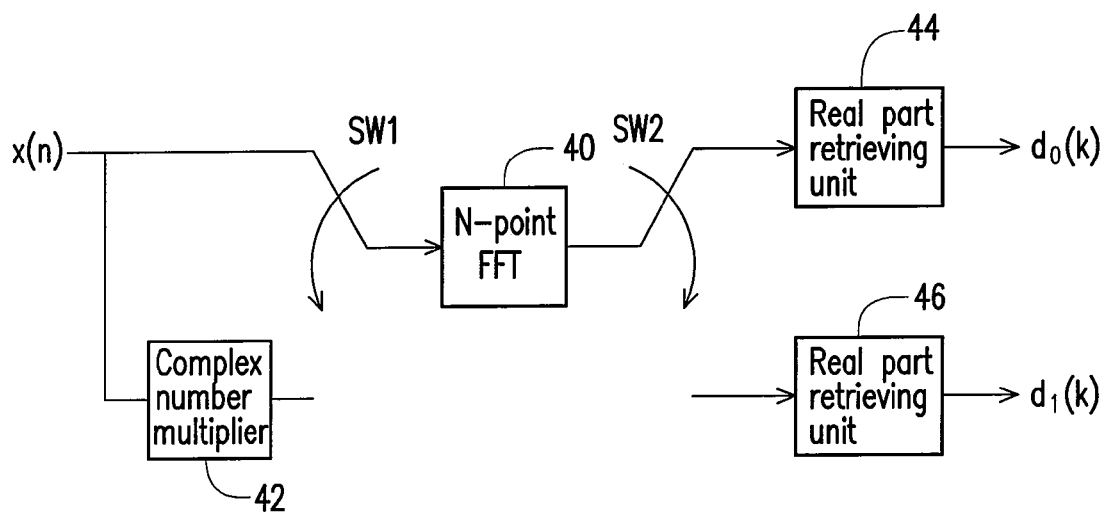
FIG. 5B is a schematic view of a circuit architecture of a receiving end corresponding to FIG. 5A.

FIG. 5A is a schematic view of a circuit architecture of an OFDM transmitting apparatus according to another exemplary embodiment of the present invention, and FIG. 5B is a schematic view of a circuit architecture of a receiving end corresponding to FIG. 5A. The architectures of FIGS. 5A and 5B are varied examples of FIGS. 3A and 4A. Here, the IFFT/FFT (or IDFT/DFT) for processing the real and the imaginary parts is shared.

The example of the circuit architecture of the transmission end is as shown in FIG. 5A, which mainly includes a signal processing unit, an input switching device SW1, an N-point IFFT (or IDFT) 30, an output switching device SW2, a buffer 32, a complex number multiplier 34, an adder 36, and a transmitting unit. The basic structure and operation of the transmitting unit can be referred to the corresponding descriptions of FIG. 3B, so the details will not be described herein again.

The signal processing unit divides the signal $d(k)=d_0(k)+j \cdot d_1(k)$ into the real parts $d_0(k)$ and the imaginary parts $d_1(k)$. In this embodiment, the signal processing unit can firstly arrange the real and the imaginary parts of the signal in order, and then transmits them to the N-point IFFT (IDFT) 30 in sequence. For example, the real and the imaginary parts of the signal are transmitted to the N-point IFFT (IDFT) 30 for the Fourier transform through the input switching device SW1 in the sequence of $d_0(0), d_1(0), d_0(1), \cdot d_1(1)\ldots$. Definitely, the above sequence is only an example, and the designer can change the sequence to be input into the N-point IFFT (IDFT) 30 according to practical requirements. After the processing, the real and the imaginary parts are respectively transmitted to the buffer 32 and the complex number multiplier 34 through the output switching device SW2. For example, the real part data $d_0(0)$ after being processed by the N-point IFFT (IDFT) 30 is firstly registered in the buffer 32. After the imaginary part data $d_1(0)$ is multiplied by the complex coefficient, the output signals of the buffer 32 and the complex number multiplier 34 are added by the adder 36. The result of addition is transmitted to the transmitting unit. Therefore, the real and the imaginary parts of the data can also be respectively transmitted by different subcarriers through the exemplary architecture of FIG. 5A, and the orthogonality between the subcarriers can also be maintained.

In addition, the receiving end receives data by the procedure which is inverse to that of FIG. 5A. The receiving unit is partially the same as that of the FIG. 3B. As shown in the example of FIG. 5B, the data after being received by the antenna of the receiving unit passes through the RF module, the ADC, and the CP removal unit etc. Then, the switching device SW1 is used to input the signal x(n) into the N-point FFT (DFT) 40 for the Fourier transform. Then, the switching unit SW2 is used to take out the real parts of the signal, so that the real part retrieving unit 44 and the real part retrieving unit 46 output $d_0(k), \cdot d_1(k)$ respectively, where k=0, 1, 2, ...,N−1.

Figure 6A:
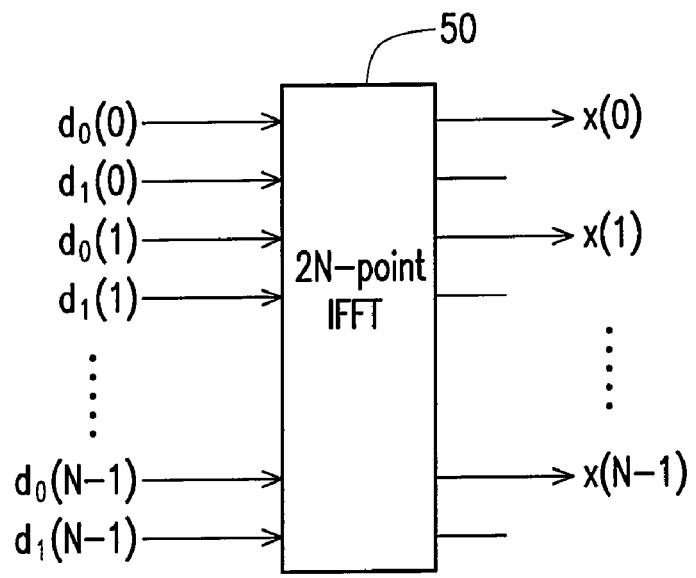
FIG. 6A is a schematic view of a circuit architecture of an OFDM transmitting apparatus according to another exemplary embodiment of the present invention.
Figure 6B:
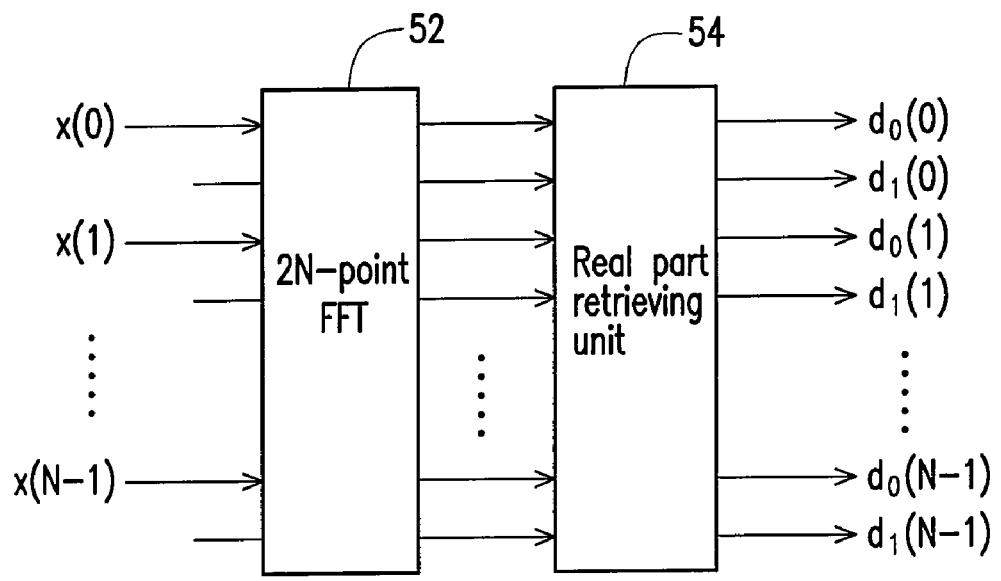
FIG. 6B is a schematic view of a circuit architecture of a receiving end corresponding to FIG. 6A.

FIG. 6A is a schematic view of a circuit architecture of an OFDM transmitting apparatus according to another exemplary embodiment of the present invention, and FIG. 6B is a schematic view of a circuit architecture of a receiving end corresponding to FIG. 6A. The difference between this embodiment and the other above embodiments that only one IFFT/FFT (or IDFT/DFT) is used. In the above embodiment, one IFFT/FFT (IDFT/DFT) is used to perform the Fourier transform on the real and the imaginary parts of the data signal respectively, such that the real and the imaginary parts are carried on different and orthogonal subcarriers. In this embodiment, a larger IFFT/FFT (IDFT/DFT) is used to perform the Fourier transform. Generally speaking, the real and the imaginary parts of the data respectively have N point, so the 2N-point IFFT/FFT (IDFT/DFT) having larger processing capability is used to perform the Fourier transform. In this manner, it is possible that only one IFFT/FFT (IDFT/DFT) is used.

As shown in the example of FIG. 6A, similar to the example of FIG. 3A or 5A, the signal processing unit (not shown) divides the signal d(k) into the real parts $d_0(k)$ and the imaginary parts $d_1(k)$, signal $d(k)=d_0(k)+j \cdot d_1(k)$, where k=0, 1, 2, . . . N−1. The real parts $d_0(k)$ and the imaginary parts $d_1(k)$ are input into the 2N-point IFFT (or IDFT) 50. After the Fourier transform, x(0), . . . , x(N−1) are output, and then are transmitted by the antenna through the transmitting unit (referring to FIG. 3B), and are received by the receiving end. In this embodiment, one single 2N-point IFFT (or IDFT) 50 is used, so the subcarriers carrying the real and the imaginary parts of the data can maintain orthogonal to one another.

In addition, on the design of the data input, for example the real parts $d_0(k)$ are inputted to odd pins of the 2N-point IFFT (or IDFT) 50, and the imaginary parts $d_1(k)$ are inputted to even pins of the 2N-point IFFFT (or IDFT) 50. In addition, the real parts $d_0(k)$ and imaginary parts $d_1(k)$ in pairs are input into the 2N-point IFFT (or IDFT) 50, i.e. the exemplary situation as shown in FIG. 6A. Definitely, the input configuration of the real parts $d_0(k)$ and the imaginary parts $d_1(k)$ is not particularly limited, and is made according to the requirements of the designer. Next, as shown in FIG. 3B, the signals $x(0), \ldots, x(N-1)$ are processed by the CP adding unit, the DAC, and the RF module etc, such that the signal can be transmitted by the antenna.

Otherwise, the construction of the receiving end is as shown in the example of FIG. 6B. The receiving unit as shown in FIG. 4B receives the discrete signals $x(0), \ldots, x(N-1)$. Then, the data $x(0), \ldots, x(N-1)$ is input into FFT (or DFT) 52 for the Fourier transform. After the Fourier transform, the signal output processing unit 54 takes out the real parts of the input signal, so as to output $d_0(k)$ and $d_1(k)$. The complexity of FIGS. 6A and 6B is $2N\log(2N)/2 = N\log(2N)$.

In the embodiment, for the purpose of convenience, the combination of the units such as the inverse Fourier transform unit, the complex number multiplier, and the adder of the transmitting end is referred to as a subcarrier orthogonalization unit. The combination of the units such as the Fourier transform unit, the complex number multiplier, and the adder of the receiving end is referred to as a subcarrier demodulation unit.

Figure 7A:
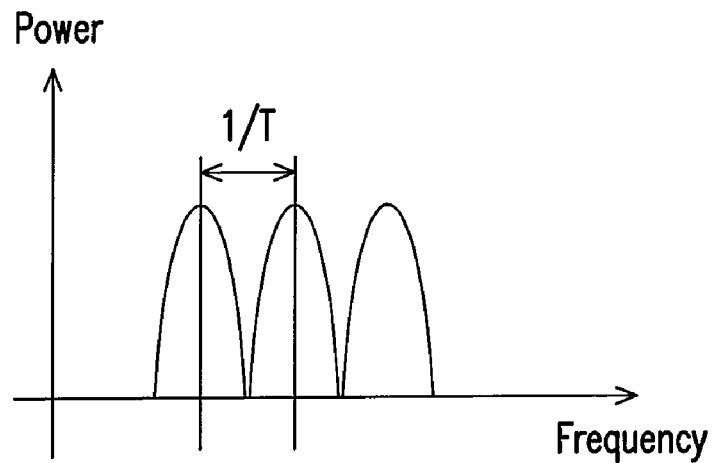
FIGS. 7A to 7D illustrate a function of a complex number multiplier according to an exemplary embodiment of the present invention.
Figure 7B:
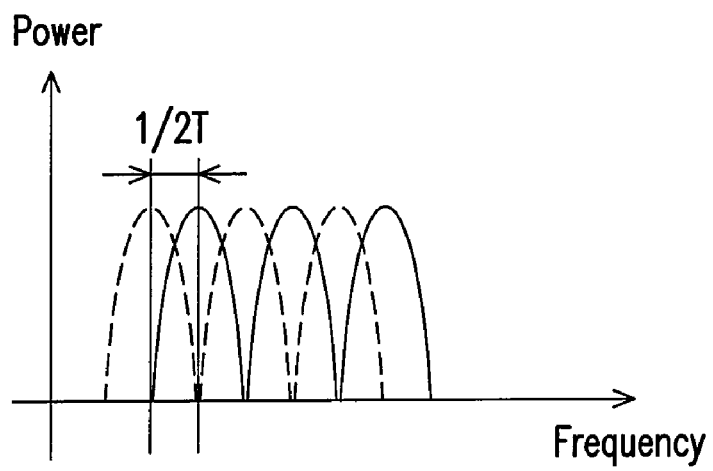
Figure 7C:
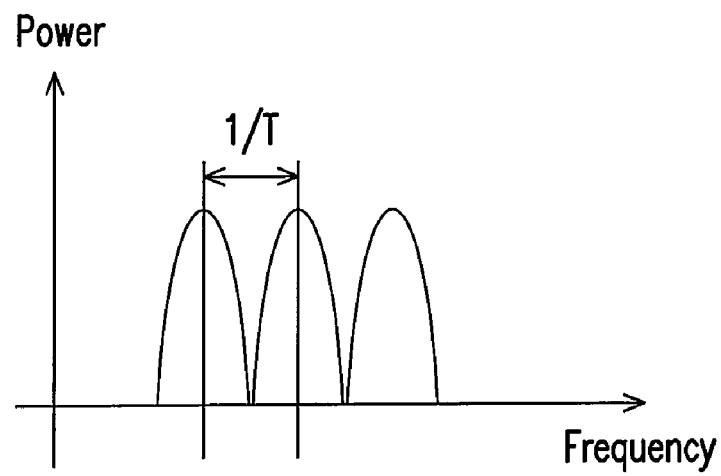

FIGS. 7A to 7D illustrate a function of a complex number multiplier according to an exemplary embodiment of the present invention. The circuit diagram of FIG. 3A is used for the illustration, the views of subcarriers in FIGS. 7A to 7D respectively correspond to the parts marked by A to D in FIG. 3A. The subcarriers carrying the imaginary parts of the signal processed by IFFT 12 is as shown in FIG. 7A, and the subcarriers carrying the real parts processed by IFFT 10 is as shown in FIG. 7C. Next, after being processed by the complex number multiplier 14, i.e, after multiplied by the complex coefficient $e^{j2\pi n/N}$, the view as shown in FIG. 7A generates a shift to obtain the view as shown by the dash line of FIG. 7B. That is, the complex number multiplier performs the shift process on the subcarriers carrying the imaginary parts of the signal.

Figure 7D:
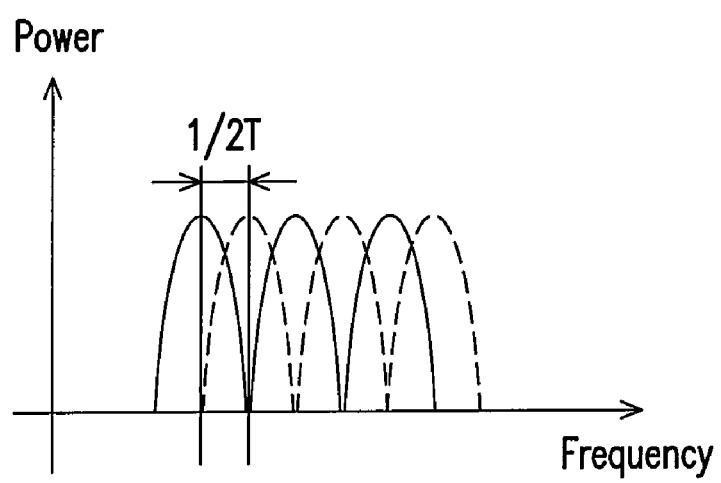

Then, by the use of the adder of the example of FIG. 3A, the signal output by the IFFT 10 and the signal output by the complex number multiplier 14 are added, and thus the waveform diagram as shown in FIG. 7D is obtained. In other words, the real and the imaginary parts of the signal are carried on different and orthogonal subcarriers. Then, the procedure such as the CP processing, the digital to analog converting DAC, and the RF signal processing is performed on the signal as shown in FIG. 7D, and the signal is transmitted by the antenna and is received by the receiving end. In addition, the complex number multiplier at the receiving end performs the inverse processing, which can refer to the illustration of FIGS. 7A to 7D.

Figure 8A:
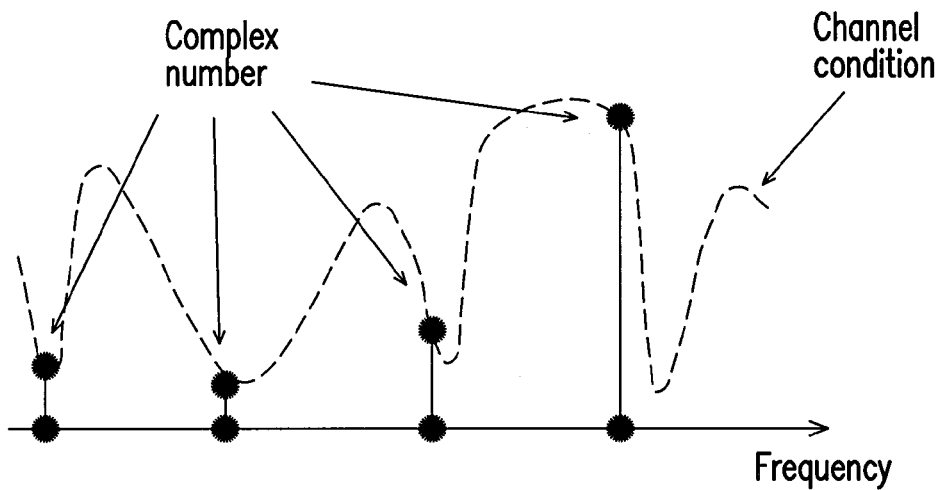
FIGS. 8A to 8B illustrate a difference between the frequency diversity of the conventional art and the frequency diversity of the present invention.
Figure 8B:
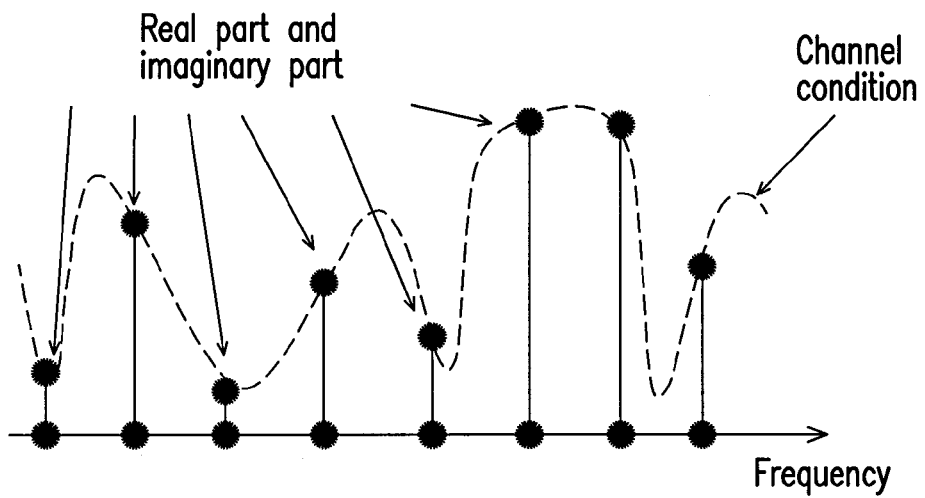

FIGS. 8A to 8B illustrate a difference between the frequency diversity of the conventional art and the frequency diversity of the present invention. As shown in FIG. 8A, there are only four QPSK subcarriers, the data carried on the subcarrier is the complex signal. On the contrary, in FIG. 8B, there are eight BPSK carriers, and the data carried on the carriers is the real and the imaginary parts of the QPSK signal respectively. The frequency diversity are increased apparently, thus improving the system performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An OFDM transmitting apparatus, comprising:
    a signal processing unit dividing a received complex signal into N real parts and N imaginary parts corresponding to N real parts, where N is an integer;
    a subcarrier orthogonalization processing unit coupled to the signal processing unit, for receiving the N real parts and the N imaginary parts of the complex signal and making a plurality of orthogonal subcarriers for carrying the N real parts and a plurality of orthogonal subcarriers for carrying the N imaginary parts carried, wherein the orthogonal subcarriers for carrying the real parts and the orthogonal subcarriers for carrying the imaginary parts have different frequencies; and
    a transmitting unit coupled to the subcarrier orthogonalization processing unit, for transmitting the subcarriers.

2. The OFDM transmitting apparatus as claimed in claim 1, wherein the subcarrier orthogonalization processing unit utilizes an inverse discrete Fourier transform.

3. The OFDM transmitting apparatus as claimed in claim 1, wherein the subcarrier orthogonalization processing unit utilizes an inverse fast Fourier transform.

4. The OFDM transmitting apparatus as claimed in claim 1, wherein the subcarrier orthogonalization processing unit further comprises:
    a first and a second N-point inverse Fourier transform unit coupled to the signal processing unit, and respectively receiving the N real parts and the N imaginary parts of the complex signal, for making the N real parts and the N imaginary parts respectively carried on the subcarriers of different frequencies;
    a complex number multiplier coupled to the second N-point inverse Fourier transform unit, for multiplying N outputs with a corresponding complex coefficient and orthogonalizing the subcarriers carrying the imaginary parts and the subcarriers carrying the real parts; and
    an adder coupled to the first N-point inverse Fourier transform unit and an output end of the complex number multiplier.

5. The OFDM transmitting apparatus as claimed in claim 1, wherein the subcarrier orthogonalization processing unit further comprises:
    an input switching device, for alternately receiving the N real parts and the N imaginary parts of the complex signal;
    an N-point inverse Fourier transform unit coupled to the input switching device, for alternately receiving the N real parts and the N imaginary parts, and making the N real parts and the N imaginary parts carried on a plurality of different subcarriers;
    an output switching device coupled to an output of the N-point inverse Fourier transform unit, for alternately outputting the different subcarriers carrying the N real parts and the N imaginary parts;
    a buffer coupled to the output switching device, for receiving the subcarriers carrying the N real parts;
    a complex number multiplier coupled to the output switching device, for receiving the subcarriers carrying the N imaginary parts and orthogonalizing the subcarriers carrying the N imaginary parts and the subcarriers carrying the N real parts; and an adder coupled to the buffer and the output end of the complex number multiplier.

6. The OFDM transmitting apparatus as claimed in claim 1, wherein the subcarrier orthogonalization processing unit further comprises:

a 2N-point inverse Fourier transform unit, for receiving the N real parts and the N imaginary parts and making the N real parts and the N imaginary parts respectively carried on a plurality of different frequency and orthogonal subcarriers.

7. The OFDM transmitting apparatus as claimed in claim 1, wherein the transmitting unit further comprises:

a cyclic prefix (CP) adding unit, for adding a CP to an output signal of the subcarrier orthogonalization processing unit;

a digital to analog converter (DAC) coupled to an output of the CP adding unit, for converting a digital signal to an analog signal; and a radio frequency (RF) processing circuit coupled to the DAC to perform RF processing on the analog signal.

8. An OFDM transmitting method, comprising:

receiving a signal having a plurality of real parts and a plurality of imaginary parts corresponding to the real parts;

making a plurality of orthogonal subcarriers for carrying the real parts and a plurality of orthogonal subcarriers for carrying the imaginary parts, wherein the orthogonal subcarriers for carrying the real parts and the orthogonal subcarriers for carrying imaginary parts have different frequencies; and transmitting the subcarriers carrying the real parts and the imaginary parts.

9. The OFDM transmitting method as claimed in claim 8, wherein the subcarriers carrying the imaginary parts and the subcarriers carrying the real parts are alternately allocated.

10. The OFDM transmitting method as claimed in claim 9, wherein the subcarriers carrying the imaginary parts are arranged between two adjacent subcarriers carrying the real parts.

11. The OFDM transmitting method as claimed in claim 8, wherein the subcarriers carrying the imaginary parts and the subcarriers carrying the real parts are divided into two groups separated by a frequency spacing.

12. The OFDM transmitting method as claimed in claim 8, wherein the subcarriers carrying the imaginary parts are separated by a predetermined number of the subcarriers carrying the real parts from one another.

* * * * *